US007690896B2

(12) United States Patent
Stevens et al.

(10) Patent No.: US 7,690,896 B2
(45) Date of Patent: Apr. 6, 2010

(54) GAS TURBINE DISK SLOTS AND GAS TURBINE ENGINE USING SAME

(75) Inventors: Lon M. Stevens, Perry, UT (US); Kevin McCusker, West Hartford, CT (US); Moon-Kyoo Brian Kang, Vernon, CT (US)

(73) Assignee: United Technologies Corporation, Hartford, CT (US)

(*) Notice: Subject to any disclaimer, the term of this patent is extended or adjusted under 35 U.S.C. 154(b) by 616 days.

(21) Appl. No.: 11/140,632

(22) Filed: May 27, 2005

(65) Prior Publication Data

US 2006/0266050 A1 Nov. 30, 2006

(51) Int. Cl.
*B64C 11/04* (2006.01)
*F02C 3/06* (2006.01)

(52) U.S. Cl. .................................... 416/219 R; 60/804

(58) Field of Classification Search ............ 416/219 R, 416/220 R; 60/804

See application file for complete search history.

(56) References Cited

U.S. PATENT DOCUMENTS 3,565,547 A * 2/1971 Hansen ................... 416/204 R
3,936,222 A 2/1976 Asplund et al.
4,191,509 A * 3/1980 Leonardi ................ 416/219 R
4,203,705 A 5/1980 Wesbecher
4,813,848 A 3/1989 Novotny
5,415,526 A * 5/1995 Mercadante et al. ......... 416/190
5,430,936 A 7/1995 Yazdzik, Jr. et al.
5,846,054 A * 12/1998 Mannava et al. ........ 416/219 R
6,254,333 B1 7/2001 Merry
6,302,651 B1 10/2001 Kildea et al.
6,315,298 B1 11/2001 Kildea et al.
6,837,685 B2 * 1/2005 Pierre ..................... 416/219 R
2009/0110561 A1 * 4/2009 Ramerth et al. ........... 416/96 R

FOREIGN PATENT DOCUMENTS

JP 58167807 * 10/1983

* cited by examiner

*Primary Examiner*—Michael Cuff
*Assistant Examiner*—Gerald L Sung
(74) *Attorney, Agent, or Firm*—Carlson, Gaskey & Olds, PC

(57) ABSTRACT

A gas turbine engine comprises a compressor section, a combustion section disposed downstream from the compressor section, and a turbine section disposed downstream from the combustion section. The turbine section includes a turbine disk defining a plurality of turbine disk slots for accommodating turbine blades. The plurality of turbine disk slots each include an inlet having a rounded periphery at a bottom portion thereof.

14 Claims, 3 Drawing Sheets

GAS TURBINE DISK SLOTS AND GAS TURBINE ENGINE USING SAME

This invention was made with Government support under F33657-99-2051-0008 awarded by the United States Air Force. The Government has certain rights in this invention.

FIELD OF THE INVENTION

This invention relates generally to gas turbine engines, and more particularly to gas turbine disk slots.

BACKGROUND OF THE INVENTION

Gas turbine engine disks commonly have slots for attaching blades which are generally axially oriented. These slots have a profile which mates with the roots of the blades, and have a configuration which will retain the blades in the slots under the applied centrifugal forces incurred in operation of the engine. The slot profiles are often of a "fir-tree" configuration to increase the load bearing area in the slot, although other configurations are also employed.

The turbine disk slots for mounting turbine blades typically have a a sharp edge entrance for airflow. The sharp edge entrance causes an unfavorable airflow separation at the slot inlet, and undesirably generates an increased heat transfer rate because of airflow reattachment.

SUMMARY OF THE INVENTION

In one aspect of the present invention, a gas turbine disk assembly comprises a turbine disk defining a plurality of turbine disk slots for accommodating turbine blades. The plurality of turbine disk slots each include an inlet having a rounded periphery at a bottom portion thereof.

In another aspect of the present invention, a gas turbine engine comprises a compressor section, a combustion section disposed downstream from the compressor section, and a turbine section disposed downstream from the combustion section. The turbine section includes a turbine disk defining a plurality of turbine disk slots for accommodating turbine blades. The plurality of turbine disk slots each include an inlet having a rounded periphery at a bottom portion thereof.

DETAILED DESCRIPTION OF THE PREFERRED EMBODIMENT

Figure 1:
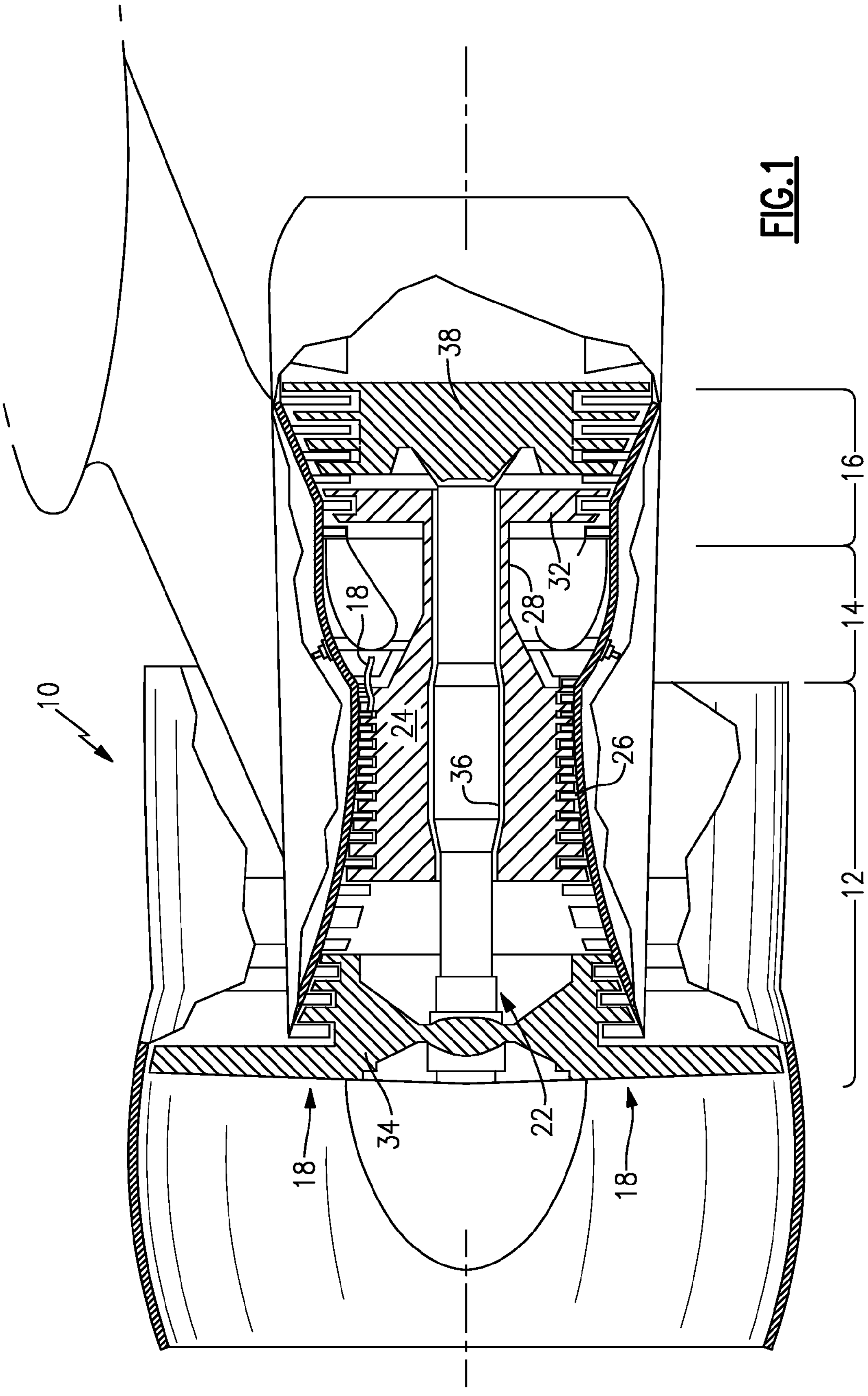
FIG. 1 is a side elevation schematic view of a gas turbine engine with the engine partially broken away to show a portion of the turbine section of the engine.

FIG. 1 is a side elevation, simplified view of an example of a gas turbine engine 10. The view is partially broken away to show elements of the interior of the engine. The engine 10 includes a compression section 12, a combustion section 14 and a turbine section 16. An airflow path 18 for working medium gases extends axially through the engine 10. The engine 10 includes a first, low pressure rotor assembly 22 and a second, high pressure rotor assembly 24. The high pressure rotor assembly 24 includes a high pressure compressor 26 connected by a shaft 28 to a high pressure turbine 32. The low pressure rotor assembly 22 includes a fan and low pressure compressor 34 connected by a shaft 36 to a low pressure turbine 38. During operation of the engine 10, working medium gases are flowed along the airflow path 18 through the low pressure compressor 26 and the high pressure compressor 34. The gases are mixed with fuel in the combustion section 14 and burned to add energy to the gases. The high pressure working medium gases are discharged from the combustion section 14 to the turbine section 16. Energy from the low pressure turbine 38 and the high pressure turbine 32 is transferred through their respective shafts 36, 28 to the low pressure compressor 34 and the high pressure compressor 26.

Figure 2:
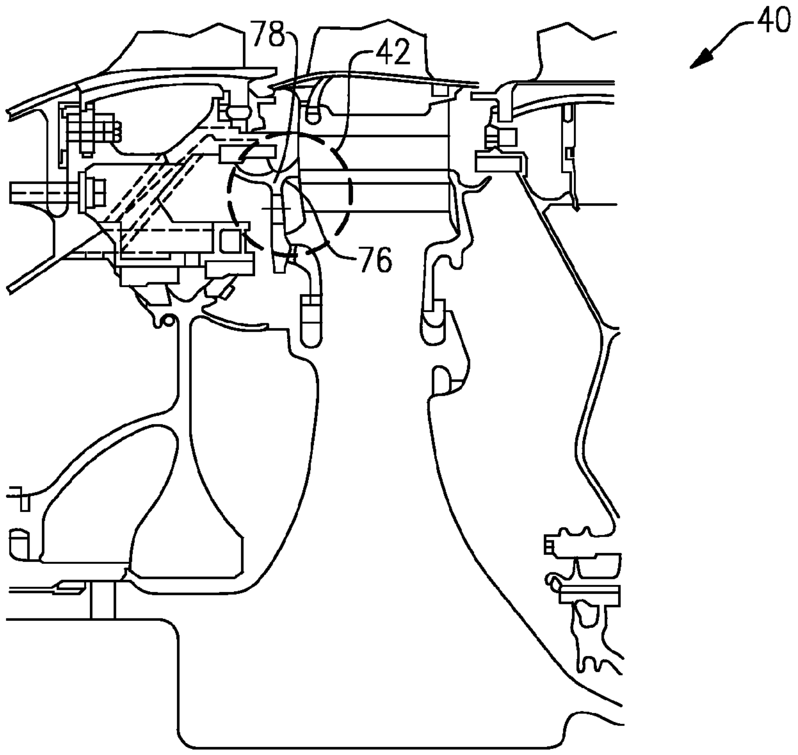
FIG. 2 is a related art partial cross-sectional, side elevation view of a gas turbine engine showing the location of turbine disk slots.
Figure 3:
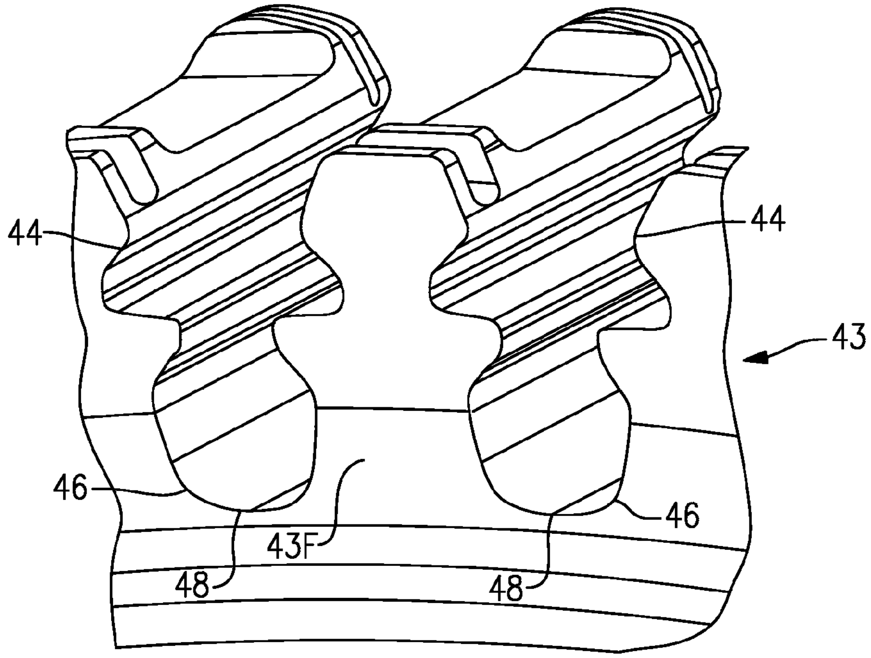
FIG.3 Related Art
FIG. 3 is an enlarged front perspective view of the gas turbine engine of FIG. 2 showing turbine disk slots.

With reference to FIG. 2, a partial cross-sectional view of a turbine section is generally indicated by the reference number 40. Within the area enclosed by circle 42, the turbine section includes a plurality of turbine blades mounted on turbine disk slots. Turning to the enlarged view of FIG. 3, conventional turbine disk slots 44 for mounting turbine blades typically have a non-rounded or otherwise sharp-edged periphery 46 at a bottom portion 48 relative a front face 43*f* of a turbine disk 43 which produces a sharp edge entrance for airflow. The sharp edge entrance causes an unfavorable airflow separation at the slot inlet, and undesirably generates an increased heat transfer rate because of airflow reattachment.

Figure 4:
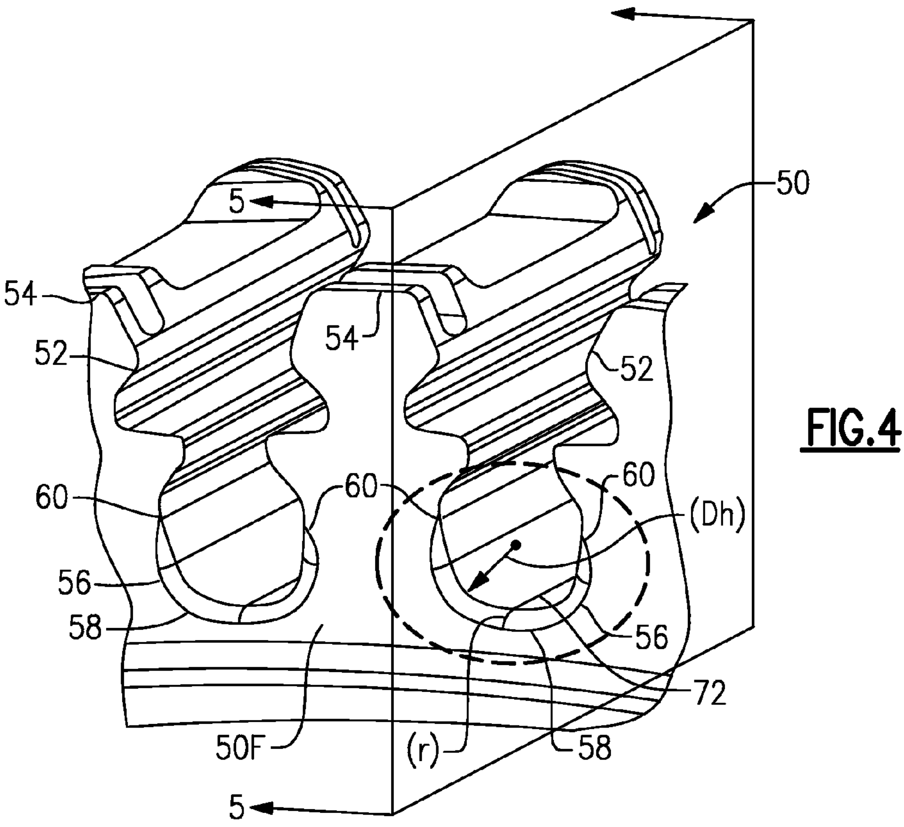
FIG. 4 is an enlarged front perspective view of turbine disk slots embodying the present invention.

Turning now to FIG. 4, a turbine disk 50 defines a plurality of turbine disk slots 52 embodying the present invention. Each turbine disk slot 52 defined by the turbine disk 50 includes an inlet 54 having a rounded periphery 56 relative a front face 50*f*. The rounded periphery 56 is generally located at a bottom portion 58 of each turbine slot 52 disk. An extra machining process is employed to generate the rounded periphery 56 of the inlet 54. A radius (r) of the rounded periphery 56 is based on a hydraulic diameter ($D_h$) of the slot 52, which in turn is based on a cooling airflow area between the bottom portion 58 of the slot 52 and a bottom of a turbine blade. To maximize the effectiveness of the inlet 54 having the rounded periphery 56, an $r/D_h$ ratio of 0.16 is preferably used, but an $r/D_h$ ratio that is either greater or lesser than 0.16 can be used without departing from the scope of the present invention. Because of the nature of the design, the entire edge of the inlet 54 of the slot 52 cannot be rounded. Instead, the full radius of the rounded periphery 56 extends approximately 180 degrees and then tapers down to points 60 as shown in FIG. 4.

Figure 5:
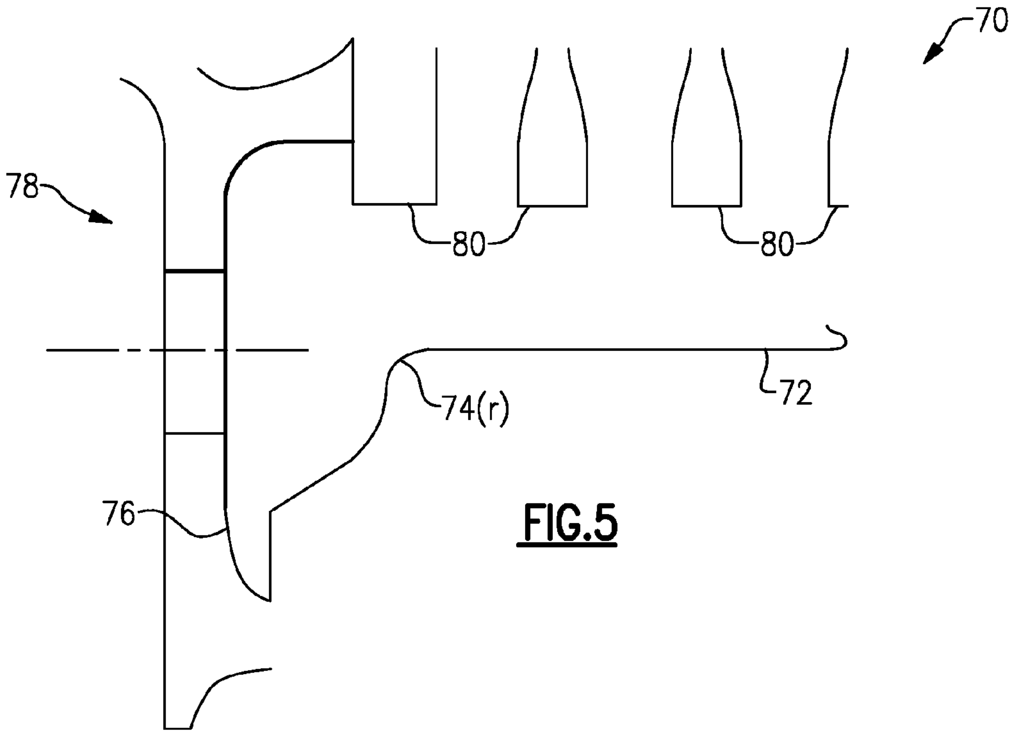
FIG. 5 is a cross-sectional, side view of a turbine disk slot embodying the present invention.

FIG. 5 illustrates a cross-section of a turbine disk 70 in accordance with the present invention. The turbine disk 70 defines a slot 72 including a rounded periphery 74 at a turbine disk slot entrance adjacent to an aft face 76 of a forward cover plate 78. The turbine disk 70 further defines a plurality of blade cooling passages 80 disposed on an opposite side of the turbine disk 70 relative to the slot 72.

It has been discovered that a rounded periphery of an inlet of a turbine disk slot offers the following advantages:

1) Reduces inlet pressure loss because of the sharp edge entrance;

2) Minimizes and/or eliminates flow separation at the inlet; and

3) Reduces the increased heat transfer rate because of flow reattachment.

As will be recognized by those of ordinary skill in the pertinent art, numerous modifications and substitutions can be made to the above-described embodiment of the present invention without departing from the scope of the invention. Accordingly, the preceding portion of this specification is to be taken in an illustrative, as opposed to a limiting sense.

What is claimed is:

1. A gas turbine disk assembly comprising:

a turbine disk defined about an axis of rotation with a turbine disk face transverse to said axis of rotation, said turbine disk defines a plurality of turbine disk slots generally parallel to said axis of portion, each of said plurality of turbine disk slots accommodates a turbine blade at least one of said plurality of turbine disk slots having a surface generally parallel to and facing a root of the respective turbine blade along a bottom portion of each of said plurality of turbine disk slots, said surface generally perpendicular to and forming an edge with said turbine disk face, said edge rounded in a direction along said axis of rotation to reduce inlet pressure loss of a cooling airflow.

2. A gas turbine disk assembly as defined in claim 1, wherein the rounded edge relative said face of said turbine disk extends approximately 180 degrees along said bottom portion thereof.

3. A gas turbine disk assembly as defined in claim 1, wherein a radius (r) of the rounded edge relative said face of said turbine disk is a function of a hydraulic diameter ($D_h$) of the slot.

4. A gas turbine disk assembly as defined in claim 3, wherein a ratio: $r/D_h$ is approximately 0.16.

5. A gas turbine engine comprising:

a compressor section;

a combustion section disposed downstream from the compressor section; and a turbine section disposed downstream from the combustion section, the turbine section including a turbine disk define about an axis of rotation with a turbine disk face transverse to said axis of rotation, said turbine disk defines a plurality of turbine disk slots generally parallel to said axis of rotation, at least one of said plurality of turbine disk slots having a surface generally parallel to and facing a root of the respective turbine blade along a bottom portion of each of said plurality of turbine disk slots, said surface generally perpendicular to and forming an edge with said turbine disk face, said edge rounded in a direction along said axis of rotation to reduce inlet pressure loss of a cooling airflow.

6. A gas turbine engine as defined in claim 5, wherein the rounded edge extends approximately 180 degrees.

7. A gas turbine engine as defined in claim 5, wherein a radius (r) of the rounded edge is a function of a hydraulic diameter ($D_h$) of the slot.

8. A gas turbine engine as defined in claim 7, wherein a ratio: $r/D_h$ is approximately 0.16.

9. A gas turbine engine disk assembly comprising:

a turbine disk rotatable about an axis of rotation with a turbine disk lace transverse to said axis of rotation, said turbine disk defines a plurality of turbine disk slots generally parallel to said axis of rotation, at least one of said plurality of turbine disk slots having a surface generally parallel to and facing a root of the respective turbine blade along a bottom portion of each of said plurality of turbine disk slots, said surface generally perpendicular to and forming an edge with said turbine disk face, said edge rounded in a direction along said axis of rotation to reduce inlet pressure loss of a cooling airflow.

10. An assembly as recited in claim 9, wherein said rounded edge extends approximately 180 degrees about a bottom portion of said at least one of plurality turbine disk slot.

11. An assembly as recited in claim 9, wherein a radius (r) of said rounded edge is a function of a hydraulic diameter ($D_h$) of said at least one turbine disk slot.

12. An assembly as recited in claim 9, wherein said face transverse to said axis of rotation is a front face of said turbine disk.

13. An assembly as recited in claim 9, wherein said rounded edge comprises a chamfer.

14. A gas turbine engine as defined in claim 5, further comprising a turbine blade mounted to each of said plurality of turbine disk slots.

* * * * *